2,969,336
Patented Jan. 24, 1961

2,969,336

EPOXIDIZED POLYESTERS FROM 3-OXATRICYCLO - (3.2.1.0$^{2,4}$) OCTANE - 6,7 - DICARBOXYLIC ACID

Benjamin Phillips and Paul S. Starcher, Charleston, W. Va., assignors to Union Carbide Corporation, a corporation of New York No Drawing. Filed Dec. 30, 1957, Ser. No. 705,770

9 Claims. (Cl. 260—22)

The present invention is directed to a novel class of epoxidized polyesters. More particularly, this invention is directed to resinous polyesters comprising the condensation product of 3-oxatricyclo(3.2.1.0$^{2,4}$)octane-6,7-dicarboxylic acid or anhydride and a polyhydric compound.

The novel epoxidized polyesters of the present invention contain the characteristic unit characterized by reference to the following general formula:

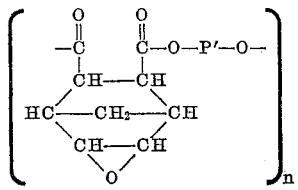

wherein P' represents the residue of a polyhydric compound and $n$ represents a whole positive integer of at least one.

The novel epoxidized polyesters of the present invention have been found to be suitable for use as resinous plasticizers and/or stabilizers; useful in the production of alkyd-type resins and suitable for use in the manufacture of epoxy resins. When it is desired to use the novel epoxidized polyesters of this invention as plasticizers and/or stabilizers, $n$, referred to above, should have a value in the range of from 1 to 10. If it is desired to employ the epoxidized polyesters as components in the manufacture of alkyd resins, $n$ should have a value generally in the range of from 50 to 100. In epoxy resin manufactures, $n$ should have a value of from 1 to 5.

The epoxidized polyesters obtained in accordance with the processes of this invention have molecular weights, as reflected by the values of $n$, generally upwards of about 300 and preferably within the range of about 200 to about 20,000, although molecular weights below and substantially above this range are obtainable, if desired. The novel epoxidized polyesters of this invention are characterized by the presence therein of oxygen in the form of an oxirane ring attached to the cycloaliphatic nucleus. The term "oxirane ring," as used herein, is deemed to be co-extensive with the term "alpha-epoxy" and denotes compounds and compositions containing the characteristic grouping,

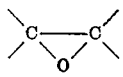

The epoxidized polyesters of the present invention can be made so as to contain olefinic double bonds as well as oxirane rings. Such polyesters can then be polymerized with other olefinically unsaturated polymerizable monomers, such as vinyl chloride, styrene and the like. Polymers formed in this manner are suitable for use as surface coatings for impervious materials, such as metal and glass and are valuable in the manufacture of laminates and particularly fiber glass laminates possessing a high degree of water resistance.

In producing the novel epoxidized polyesters of the present invention, a peroxidic epoxidizing agent is normally employed to epoxidize the olefinic unsaturation of the polyester prepared from the condensation of bicyclo (2.2.1)-5-heptene-2,3-dicarboxylic acid and a polyhydric compound. Hereinafter, the aforementioned unsaturated polyester will be referred to as the unsaturated polyester. Also, where reference is made to either bicyclo(2.2.1)-5-heptene-2,3-dicarboxylic acid or 3-oxatricyclo(3.2.1.0$^{2,4}$) octane-6,7-dicarboxylic acid, it is to be understood that said reference also includes the anhydride forms of said acids. As epoxidizing agents, any one of the several peracids, such as perbenzoic and peracetic acid, can be employed. It is preferred, however, to use the peracids and aldehyde monoperacylates obtained by the reaction of elemental oxygen and a saturated aliphatic aldehyde containing from 2 to 3 carbon atoms. Peroxidic epoxidizing agents obtained in this manner are substantially free of inorganic ionic impurities which tend to encourage side reactions involving the oxirane ring during and after epoxidation. The epoxidation can be carried out by adding the epoxidizing agents of the type referred to aforesaid to the unsaturated polyester. It is preferred to add the epoxidizing agent gradually over a period of several hours, although all of the reactants may be added at once, if desired. Reaction temperatures for the epoxidation reaction can be selected from the range of from —25° C. to 150° C. At the lower temperatures, the reaction naturally will proceed at a slower rate and longer reaction times are required for completion of the reaction. The efficiencies and yields of products are lower when temperatures of about 150° C. are employed.

It is preferred, therefore, to conduct the epoxidation reaction at temperatures in the range of from about 10° C. to 90° C.

One molecule of epoxidizing agent is theoretically needed to epoxidize one olefinic double bond equivalent of unsaturated polyester. By the term "olefinic double bond equivalent," as used herein, is meant the number of mols of olefinic carbon to carbon unsaturation. For example, one mol of a compound containing one olefinic group to the molecule contains one olefinc double bond equivalent. In the practice of this invention, in order to substantially epoxidize all of the olefinic double bonds of the unsaturated polyesters, it is preferred to employ ratios of more than one mol of epoxidizing agent per epoxidizable olefinic double bond equivalent. However, ratios equal to or less than one mol of epoxidizing agent to olefinic double bond equivalent can be employed and the product can contain some unepoxidized olefinic double bonds. In some cases, the presence of olefinic unsaturation in the epoxidized polyesters of the present invention, is desirable.

After the epoxidation reaction is complete or when desired, low boiling components, such as solvent, excess epoxidizing agent and other by-products can be removed from the reaction mixture. The removal of low boiling constituents can be effected by any suitable means, such as by distillation or extraction. Normally, the removal of low boiling materials can be expeditiously accomplished by feeding the reaction mixture into a still kettle containing a pot-boiler, such as ethylbenzene, refluxing under reduced pressures and stripping the low boiling components. The epoxidized polyesters can then be recovered as residue products.

Polyhydric alcohols which can be used in the formation of bicyclo(2.2.1)-5-heptene-2,3-dicarboxylic acid polyesters contain at least two hydroxyl groups attached to two different interconnected aliphatic carbon atoms, Typical polyhydric alcohols can be represented by the general formula:

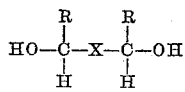

wherein R represents an alkyl group or hydrogen and can be the same or different for all R's in the molecule. X can represent a single bond or a divalent group composed of a carbon atom or group of carbon atoms interconnected by single or multiple bonds to which such groups as hydrogen, alkyl, hydroxyl, amino, cyclic groups and the like or combinations thereof can be attached. X also represents such divalent groups as oxyalkylene or polyoxyalkylene groups. X may represent nitrogen to which other groups, for example, hydrogen, alkyl, alkanol and the like may be attached, or it may represent sulfur. It can also represent cyclic groups, such as phenylene, cyclohexylene and the like. The presence of other groups, with the exception of phenolic and tautomeric enolic groups, not specifically listed herein and not participating in the polyesterification reaction used in preparing unsaturated polyesters is by no means harmful and, in fact, can be useful in developing special properties in our polyesters. Various other polyhydric alcohols are useful in this invention and include the aliphatic cyclic polyols. Such aliphatic cyclic polyols can be represented by the foregoing formula, wherein both R's taken together represent an alkylene or substituted alkylene group and X may represent an alkylene group or a single bond. Mixtures of polyhydric alcohols or only one polyhydric alcohol can be employed in forming polyesters for epoxidation in accordance with this invention.

Representative of the polyhydric alcohols which can be employed in preparing the unsaturated polyesters are the glycols and polyoxyalkylene glycols, such as ethylene glycol, diethylene glycol, polyethylene glycols, propylene glycol, tripropylene glycol, polypropylene glycols, polyethylene-polypropylene glycols, trimethylene glycol, butanediols, pentanediols, 2-ethyl-1,3-hexanediol, 2,5-hexanediol, 2-methyl-2,4-pentanediol, 12,13-tetraconsanediol, 2-butene-1,4-diol, 2-methoxymethyl-2,4-dimethyl-1,5-pentanediol, diethanolamine, triethanolamine, glycerol, polyglycerols, pentaerithritol, sorbitol, polyvinyl alcohols, cyclohexanediols, cyclopentanediols, inositol, and the like. Dihydric alcohols free of acetylenic unsaturation and composed of carbon, hydrogen and oxygen combined as hydroxyl oxygen or ether oxygen connecting two otherwise unconnected carbon atoms and having not more than 24 carbon atoms are preferred. The alkylene glycols and polyoxyalkylene glycols are particularly preferred.

Our polyesters can be modified by the inclusion of monocarboxylic acids, hydroxy acids or monohydric alcohols with the polyhydric alcohols and dicarboxylic reactant employed in preparing the unsaturated polyesters. These monohydric compounds can be used to promote the formation of small molecules, to alter the solubility, to lower the acidity and for other purposes. Monocarboxylic acids which can be employed for accomplishing these and other purposes include the fatty acids, such as those which can be derived from animal and vegetable oils including linseed, soya, oiticica, tung, cottonseed, perilla oils and the like. They can be employed as mixtures, for example, as in non-drying, semi-drying or drying oils, or alone as individual compounds. They may be obtained also from the oxidation of petroleum products or by chemical synthesis. The monocarboxylic acids may comprise open chain, branched chain or cyclic groups and can be saturated or unsaturated. In addition, they can contain such groups as halogen, amino, epoxy and nitro groups and many others. Typical monocarboxylic acids include acetic acid, butyric acid, lauric acid, stearic acid, lignoceric acid, acrylic acid, crotonic acid, undecylenic acid, oleic acid, linoleic acid, linolenic acid, clupanodonic acid, cyclohexanecarboxylic acids, cyclohexenecarboxylic acids, benzoic acid, tetrahydrobenzoic acid, toluic acid, 2,3-epoxybutyric acid, 10,11-epoxyundecanoic acid, 9,10-epoxystearic acid, epoxidized tall oil fatty acids, epoxidized soy bean oil fatty acids, and the like. Monocarboxylic acids free of acetylenic unsaturation and composed of carbon, hydrogen and oxygen combined only as hydroxyl oxygen or carboxyl carbonyl oxygen and having not more than 18 carbon atoms, are preferred. Particular preferred monocarboxylic acids are the fatty acids. Monohydric alcohols useful in modifying our polyesters may be derived from many sources including hydrogenation of saturated and unsaturated glycerides, oxidation of petroleum products and chemical synthesis. They can be employed individually or as mixtures with other monohydric alcohols. They may comprise open chain, cyclic or branched chain groups in their molecular makeup. They may contain other groups, such as amino, nitro, epoxy, halogen, and the like with the exception of phenolic and tautomeric enolic groups. These monohydric alcohols can be saturated or unsaturated. Representative of monohydric alcohols which can be employed in modifying our polyesters are methanol, propanol, butanol, decyl alcohol, lauryl alcohol, cetyl alcohol, stearyl alcohol, 9-heptadecanol, the alkylene and polyalkylene glycol monoethers, e.g., ethylene glycol monoethyl ether, ethylene glycol monophenyl ether, polyethylene glycol monomethyl ether, allyl alcohol, crotyl alcohol, pentenol, 2-ethyl-2-hexenol, 2-cyclopentenol, undecenol, oleyl alcohol, linoleyl alcohol, linolenyl alcohol, 3-cyclohexenol, phenylethanol, epoxybutyl alcohol, epoxyundecanol, 9,10-epoxystearyl alcohol, and the like. Monohydric alcohols free of acetylenic unsaturation and composed of carbon, hydrogen and only such oxygen atoms as are connected to carbon or hydrogen and have not more than one bond thereof connected to carbon or hydrogen are preferred. Those composed of not more than 18 carbon atoms are also preferred. Particularly preferred monohydric alcohols are the fatty alcohols.

The properties of our polyesters can be further modified by co-condensing other dicarboxylic acids or anhydrides in the reaction mixture of polyhydric alcohol and bicyclo-(2.2.1)-5-heptene-2,3-dicarboxylic acid or anhydride in the preparation of unsaturated polyesters for subsequent epoxidation. The oxirane oxygen content per unit weight of our epoxy polyesters can be controlled as desired, for example, by the use of a saturated or unsaturated acid or anhydride. Through the use of a saturated dicarboxylic acid or anhydride this oxirane content can be lowered. The epoxy polyesters obtained in this manner can be particularly important, for example, when reacted with highly reactive active hydrogen compounds wherein it may be desirable to maintain the reaction vigor within easily controllable limits. By the use of an unsaturated dicarboxylic acid or anhydride which contains more olefinic carbon groups per unit weight than the bicyclo(2.2.1)-5-heptene-2,3-dicarboxylic acid employed, and such olefinic carbon groups are at least as easily epoxidizable as those of said bicyclo(2.2.1)-5-heptene-2,3-dicarboxylic acid, the oxirane oxygen content per unit weight of our epoxy polyester made therewith can be increased. Such epoxypolyesters can be particularly valuable, for example, when reacted with active hydrogen compounds of low reactivity wherein a more vigorous reaction may be desired. Epoxy polyesters having olefinic groups can also be produced by epoxidizing unsaturated polyesters prepared from polyhydric alcohols, bicyclo-(2.2.1)-5-heptene-2,3-dicarboxylic acid and unsaturated dicarboxylic acids or anhydrides having olefinic groups which are not as easily epoxidizable as those contained by said bicyclo(2.2.1)-5-heptene-2,3-dicarboxylic acid, for example, olefinic groups in conjugation with carbonyl groups, such as those contained by maleic acid or anhydride. Such unsaturated epoxy polyesters are particularly valuable in that they may be copolymerized with vinyl compounds, for example, styrene, vinyl chloride and the like, to form a variety of new resins. Further properties of our polyesters, such as solubility, resin forming properties, viscosity, and other physical properties, can also be modified by the use of dicarboxylic acids or anhydrides in preparing unsaturated polyesters for epoxidation. As co-condensing modifiers, the dicarboxylic acids can be saturated or unsaturated and may contain open chain, cyclic or branched chain groups. They may contain other groups besides two carboxyl groups, for example, amino, hydroxyl and thio groups. Typical dicarboxylic acids include malonic, succinic, adipic, azelaic, maleic, citraconic, dodecamethylene dicarboxylic, tetracosane dicarboxylic, alkenylsuccinic, e.g., ethylbutenylsuccinic, 2-hexene-1,6-dicarboxylic, cyclohexanedicarboxylic, phthalic, phenylenediacetic acids and anhydrides and the like. Cocondensing dicarboxylic acids which are preferred for use in modifying the polyesters are composed of carbon, hydrogen and oxygen combined only as carboxyl carbonyl oxygen or hydroxyl oxygen. Preferred co-condensing dicarboxylic acids can be saturated or unsaturated but are free of acetylenic unsaturation. It is further preferred that the acyl groups derived from bicyclo(2.2.1)-5-heptene-2,3-dicarboxylic acid or anhydride constitute at least about 10 percent of the total number of the carboxylic diacyl groups contained by the modified unsaturated polyesters prepared for epoxidation.

Further modifications of our polyesters are also possible by the use of hydroxymonocarboxylic acids or lactones in the reaction mixture of polyhydric alcohols and bicyclo(2.2.1)-5-heptene-2,3-dicarboxylic acids or anhydrides used in preparing unsaturated polyesters for epoxidation. Typical hydroxymonocarboxylic acids include glycollic acid, mandelic acid, hydroxybutyric acid, and typical lactones include caprolactones, valerolactones and the like.

Particularly valuable resins can be obtained from the copolymerization of vinyl compounds with those epoxy polyesters of our invention which can contain olefinic groups. An epoxy polyester which can be produced by the epoxidation of unsaturated polyesters prepared from a dihydric alcohol, a bicyclo(2.2.1)-5-heptene-2,3-dicarboxylic acid or anhydride and maleic acid or anhydride, for example, contains reactive olefinic groups which remain unepoxidized because of the hindering effect of carbonyl groups in conjugation therewith. The relative proportions of oxirane oxygen and olefinic groups contained by such epoxy polyesters can be easily controlled, as desired, by adjusting the relative molar amounts of dicarboxylic acids employed in preparing the unsaturated polyesters for epoxidation. In this manner, epoxy polyesters having a wide range of olefinic group content can be obtained to fit specific requirements. One particularly important use of such unsaturated epoxy polyesters is in copolymerization with a vinyl compound in the manufacture of glass laminates. Glass laminates having notably high resistance to permeation by fluids, especially water, and subsequent deterioration caused thereby can be manufactured from a vinyl compound, such as styrene and our unsaturated epoxy polyesters which contain olefinic groups in conjugation with carbonyl groups, such as those obtained by the epoxidation of maleic anhydride-dihydric alcohol-bicyclo(2.2.1)-5-heptene-2,3-dicarboxylic acid polyesters. For example, glass laminates having improved water resistance can be manufactured by using as a binder for glass, styrene and unsaturated epoxy polyesters having as little as about 15 percent to 25 percent of the constituent diacyl groups represented by 3-oxatricyclo(3.2.1.0$^{2,4}$)octane-6,7-dicarboxylic acid.

The concentration of the epoxidized polyesters of the invention as a plasticizer in a resin, such as a vinyl chloride resin, may vary widely, depending on the particular results desired. Low concentrations of the order of 1 percent by weight are employable as stabilizers or as processing aids in rigid compositions rather than for plasticizing action. Higher concentrations up to about 50 percent or more are used when flexibility is the overriding desideratum.

The method of the invention and the utility of the products obtained thereby will become further apparent from the following detailed examples included to illustrate the best modes presently contemplated for carrying out the invention.

In certain examples, the analysis for the oxirane oxygen content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the oxirane oxygen content can be determined.

In other examples, the analysis for oxirane oxygen was conducted by means of the hydrogen bromide method. In this method, a sample (calculated to consume 50 percent of the HBr) is introduced into 25 milliliters of a 0.5 N solution of hydrogen bromide in glacial acetic acid (containing enough phenol to make the solution a light straw color) and allowing the mixture to react for 30 minutes at room temperature. The excess or unused HBr is titrated with a 0.2 N solution of sodium acetate in glacial acetic acid using a crystal violet indicator. A blank determination is run in exactly the same manner except that the sample is omitted. The difference between the titration of the sample and the blank is a measure of the amount of epoxide present in the sample.

The analyses in the examples for determining epoxidant, e.g., peracetic acid or acetaldehyde monoperacetate, content can be performed, for example, by introducing one to 1.5 grams of a sample of unknown epoxidant concentration into a flask containing a mixture of 60 milliliters of 50 weight percent aqueous sulfuric acid solution and five milliliters of a saturated potassium iodide solution. The flask is swirled to mix the solutions and then titrated immediately with a 0.1 N aqueous sodium thiosulfate solution to a colorless endpoint. From the titration data thus obtained, a determination of epoxidant content can be made.

Molecular weights of unsaturated polyesters wherever given in the examples were determined by the boiling point elevation method. The degrees of olefinic unsaturation of unsaturated polyesters prepared in the examples are indicated by iodine numbers as determined by the Wijs procedure. Olefinic double bond equivalents of unsaturated polyesters can be calculated from these iodine numbers. The acidity of unsaturated polyesters in the examples were determined by titrating a 1-gram sample of unsaturated polyester with a 1 N aqueous solution of base, such as sodium hydroxide or potassium hydroxide, to a phenolphthalein endpoint. Hydroxyl group contents of unsaturated polyesters were determined by the pyridine-phthalic anhydride or pyridine-acetic anhydride methods.

EXAMPLE 1

*Preparation of the polyepoxide of the polyester of propylene glycol, bicyclo(2.2.1)-5-heptene-2,3-dicarboxylic anhydride and oleic acid*

(a) PREPARATION OF THE POLYESTER

One hundred fifty-two grams of propylene glycol (2 mols), 246 grams of bicyclo(2.2.1)-5-heptene 2,3-dicarboxylic anhydride (1.5 mols) and 254 grams of oleic acid (0.9 mol) were refluxed in benzene and the evolved water removed through a decanter. Reaction was completed in 73 hours over a temperature range of from 131° C. to 185° C. The reaction product was stripped in a goose-neck still to 187° C. at 4 mm. Hg pressure absolute, then steam stripped for one hour at a temperature of from 118° C. to 122° C. at 12 to 14 mm. Hg pressure absolute. There were recovered 563 grams of a residue product, characterized by the following physical properties:

| | |
|---|---|
| Gardner color | 5 |
| Acidity, cc. N base/g | 0.378 |
| Hydroxyl, percent OH | 0.72 |
| Viscosity (20° C.) centipoises | 6400 |

(b) PREPARATION OF THE POLYEPOXIDE

The polyester, prepared above, was charged to a 4-necked reaction flask equipped with condenser, thermometer, stirrer, and addition port. To 472 grams of this polyester were added 733 grams of a 25.3 percent solution of peracetic acid in acetone over a period of 2 hours. The temperature was maintained at 40° C. throughout the addition and for a period of 6.5 hours following the completion of the addition. An analysis for peracetic acid indicated that 87.5 percent of the peracetic acid charged to the reaction had been consumed.

The volatile portion of the reaction mixture was removed by co-distillation with ethylbenzene, and the last traces of volatile materials were removed by stripping to a kettle temperature of 100° C. at 3 mm Hg pressure absolute. The residue product was characterized by the following properties:

| | |
|---|---|
| Acidity (calc. as acetic acid) | 1.3 percent. |
| Iodine number | 2.8. |
| Gardner (1933) color | 3. |
| Percent oxirane oxygen (hydrogen bromide method) | 5.09 percent. |
| Purity $\left(\frac{\text{actual percent oxirane oxygen}}{\text{theoritical percent oxirane oxygen}} \times 100\right)$ | 82.1 percent. |
| Viscosity (visual observation) | Very thick but still fluid at room temperature. |

EXAMPLE 2

*Preparation of the polyepoxide of the polyester of 2-ethyl-1,3-hexanediol and bicyclo(2.2.1)-5-heptene-2,3-dicarboxylic anhydride*

(a) PREPARATION OF THE POLYESTER

Employing the same procedure as described in Example 1, 292 grams of 2-ethyl-1,3-hexanediol (2 mols) and 246 grams of bicyclo(2.2.1)-5-heptene-2,3-dicarboxylic anhydride (1.5 mols) were refluxed in xylene for 45 hours at 159° C. to 184° C. After stripping in a goose-neck still to 188° C. at 3 mm. Hg pressure absolute, there remained 500 grams of residue product, characterized by the following physical properties:

| | |
|---|---|
| Gardner color | 2. |
| Acidity, cc. N base/g | 0.049. |
| Hydroxyl, percent OH | 3.03. |
| Viscosity (25° C.) | Would barely flow. |
| Iodine number | 70.8. |
| Molecular weight | 950. |

(b) PREPARATION OF THE POLYEPOXIDE

A solution of 322 grams of the polyester prepared above in an equal weight of ethylbenzene was heated to 40° C. with stirring. To the polyester solution was added, over a period of one hour and 5 minutes, 408 grams of a 25.6 percent solution of peracetic acid in acetone. The reaction was continued for an additional 4 hours at 40° C. and then was allowed to stand overnight at room temperature. The reaction mixture was heated for an additional 3 hours the next day. The volatile portion of the reaction mixture was removed by co-distillation with ethylbenzene and was stripped to a kettle temperature of 110° C. at 4 mm. Hg pressure absolute. The light-colored residue product had the following properties:

| | |
|---|---|
| Acidity (calc. as acetic acid) | 0.518 percent. |
| Iodine number | 1.9. |
| Gardner (1933) color | 1. |
| Percent oxirane oxygen (hydrogen bromide method) | 4.49 percent. |
| Purity $\left(\frac{\text{actual oxirane oxygen}}{\text{theoretical oxirane oxygen}} \times 100\right)$ | 86.5 percent. |
| Viscosity (visual observation) | Barely pours at room temperature. |

EXAMPLE 3

*Preparation of the polyepoxide of the polyester of 2-ethyl-1,3-hexanediol, bicyclo(2.2.1)-5-heptene-2,3-dicarboxylic anhydride and oleic acid*

(a) PREPARATION OF THE POLYESTER

Employing the same general procedure as described in Example 1, 292 grams of 2-ethyl-1,3-hexanediol (2 mols), 246 grams of bicyclo(2.2.1)-5-heptene-2,3-dicarboxylic anhydride (1.5 mols) and 254 grams of oleic acid (0.9 mol) were refluxed in xylene solution for 70 hours at 164° C. to 176° C. After stripping in a goose-neck still to 193° C. at 4 mm. Hg pressure absolute and steaming for one hour at 124° C. to 134° C. at 13 mm. Hg pressure absolute, there remained 723 grams of residue product, characterized by the following physical properties:

| | |
|---|---|
| Gardner color | 2–3 |
| Acidity, cc. N base/g | 0.184 |
| Hydroxyl, percent OH | 0.52 |
| Iodine number | 75.6 |
| Viscosity (20° C.) centipoises | 7300 |
| Molecular weight | 940 |

In a similar manner, oleyl alcohol can be substituted for the oleic acid to produce a polyester containing oleyl alcohol groups. Such a polyester is prepared by reacting a recipe comprising 2 mols of bicyclo(2.2.1)-5-heptene-2,3-dicarboxylic acid, 1.5 mols of 2-ethyl-1,3-hexanediol and 1.1 mols of oleyl alcohol.

(b) PREPARATION OF THE POLYEPOXIDE

The above polyester was charged to a reaction flask, stirred, and heated to 40° C. Over a period of 2 hours and 20 minutes, a total of 827 grams of a 25.6 percent solution of peracetic acid solution in acetone was added to the polyester with stirring. The reaction was continued for 7 additional hours at a temperature of 40° C. At the end of this time, analyses for peracetic acid indicated that 79 percent of the theoretical amount of peracetic acid had been used and that the reaction had come to a standstill.

The volatile portion of the reaction mixture was removed by co-distillation with ethylbenzene and stripped in a manner similar to that used in Example 1. The residue product had the following properties:

| | |
|---|---|
| Acidity (calc. as acetic acid) | 0.9 percent. |
| Iodine number (Wijs method) | 0.0. |
| Gardner (1933) color | 3. |
| Percent oxirane oxygen (hydrogen bromide method) | 4.12 percent. |
| Purity $\left(\frac{\text{actual percent oxirane oxygen}}{\text{theoretical percent oxirane oxygen}} \times 100\right)$ | 84.5 percent. |
| Viscosity (visual observation) | Slightly more viscous than starting polyester. |

EXAMPLE 4

*Preparation of the polyepoxide of an oil-modified bicyclo-(2.2.1)-5-heptene-2,3-dicarboxylic acid ester resin*

(a) PREPARATION OF THE POLYESTER

A liquid oil-soluble and heat reactive resin was made from a monoglyceride of linseed oil by heating the linseed oil with about two molar proportions of glycerol in the presence of about one-half of one percent of litharge and held at a temperature of about 210° C. to 230° C. until homogeneous. To 209 parts of the aforementioned monoglyceride were added about 8 parts of glycerine and 123 parts of bicyclo(2.2.1)-5-heptene-2,3-dicarboxylic acid anhydride. The mass was reacted for about 4 hours at about a temperature of 200° C. or until the acid value was about 40 to 45. During the reaction, the mass was blanketed with carbon dioxide.

(b) PREPARATION OF THE POLYEPOXIDE

One hundred ninety-two grams of the aforementioned polyester were dissolved in 500 grams of xylene and heated under reflux in a still kettle equipped with a 3-foot column packed with glass helices at a pressure of from 67 to 70 mm. Hg absolute, so as to maintain the kettle temperature of about 70° C. Over a period of 3 hours, 487 grams of a 58 percent solution of acetaldehyde monoperacetate in acetone were added in dropwise fashion to the still kettle. Acetaldehyde, acetone, acetic acid and some xylene were removed continuously at the still head throughout the addition period. After the addition of the acetaldehyde monoperacetate was complete, the kettle material was stripped to a 60 percent total solids content and a sample was withdrawn for oxirane oxygen analysis by the pyridine hydrochloride method. The analysis indicated that the resin had an oxirane oxygen content of 4.41 percent.

What is claimed is:

1. A polyester containing the characteristic unit defined by the formula:

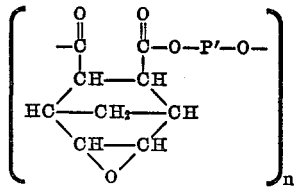

wherein P' represents the residue of an aliphatic polyhydric alcohol and $n$ represents a whole positive integer of at least one.

2. Oxirane oxygen-containing polyesters of bicyclo-(2.2.1)-5-heptene-2,3-dicarboxylic acid and polyhydric alcohols wherein the oxirane oxygen is present in the 5,6-ring positions of the bicyclo(2.2.1)-5-heptane-2,3-dicarbonyl groups of said polyesters.

3. Oxirane oxygen-containing polyesters of bicyclo-(2.2.1)-5-heptene-2,3-dicarboxylic acid, polyhydric alcohols and monocarboxylic acids wherein the oxirane oxygen is present in the 5,6-ring positions of the bicyclo-(2.2.1)-5-heptane-2,3-dicarbonyl groups of said polyesters.

4. Oxirane oxygen-containing polyesters of bicyclo-(2.2.1)-5-heptene-2,3-dicarboxylic acid, polyhydric alcohols and monohydric alcohols wherein the oxirane oxygen is present in the 5,6-ring positions of the bicyclo-(2.2.1)-5-heptane-2,3-dicarbonyl groups of said polyesters.

5. Oxirane oxygen-containing polyesters of bicyclo-(2.2.1)-5-heptene-2,3-dicarboxylic acid and polyhydric alcohols having at least 10 percent of the total number of diacyl groups of said polyester derived from bicyclo-(2.2.1)-5-heptene-2,3-dicarboxylic acid and wherein the oxirane oxygen is present in the 5,6-ring positions of the bicyclo(2.2.1)-5-heptane-2,3-dicarbonyl groups of said polyesters.

6. Oxirane oxygen-containing polyesters of bicyclo-(2.2.1)-5-heptene-2,3-dicarboxylic acid, polyhydric alcohols and aliphatic olefinically unsaturated monocarboxylic acids having at least 10 percent of the total number of diacyl groups of said polyester derived from bicyclo-(2.2.1)-5-heptene-2,3-dicarboxylic acid and wherein the oxirane oxygen is present in the 5,6-ring positions of the bicyclo(2.2.1)-5-heptane-2,3-dicarbonyl groups of said polyesters.

7. Oxirane oxygen-containing polyesters of bicyclo-(2.2.1)-5-heptene-2,3-dicarboxylic acid and 2-ethyl-1,3-hexanediol wherein the oxirane oxygen is attached to the 5,6-ring positions of the bicyclo(2.2.1)-5-heptane-2,3-dicarbonyl groups of said polyester.

8. Oxirane oxygen-containing polyesters of bicyclo-(2.2.1)-5-heptene-2,3-dicarboxylic acid, propylene glycol, and oleic acid, wherein an oxirane oxygen is attached to the 5,6-ring positions of the bicyclo(2.2.1)-5-heptane-2,3-dicarbonyl groups of said polyester.

9. Oxirane oxygen-containing polyesters of bicyclo-(2.2.1)-5-heptene-2,3-dicarboxylic acid, 2-ethyl-1,3-hexanediol and oleic acid wherein an oxirane oxygen is attached to the 5,6-ring positions of the bicyclo(2.2.1)-5-heptane-2,3-dicarbonyl groups of said polyester.

References Cited in the file of this patent
UNITED STATES PATENTS

| | | |
|---|---|---|
| 2,745,847 | Phillips et al. | May 15, 1956 |
| 2,786,066 | Frostick et al. | Mar. 19, 1957 |
| 2,786,067 | Frostick et al. | Mar. 19, 1957 |
| 2,794,812 | Phillips et al. | June 4, 1957 |